United States Patent [19]

Evans

[11] Patent Number: 4,699,974

[45] Date of Patent: Oct. 13, 1987

[54] METHOD OF PREPARING COPOLYESTER CARBONATE FROM CYCLIC AROMATIC POLYCARBONATE OLIGOMER AND LACTONE

[75] Inventor: Thomas L. Evans, Clifton Park, N.Y.

[73] Assignee: General Electric Company, Schenectady, N.Y.

[21] Appl. No.: 894,154

[22] Filed: Aug. 7, 1986

[51] Int. Cl.[4] .............................................. C08G 63/42
[52] U.S. Cl. .................................... 528/354; 528/355; 528/356; 528/357; 528/358; 528/359; 528/370; 528/371
[58] Field of Search ............... 528/354, 355, 356, 357, 528/358, 359, 370, 371

[56] References Cited

U.S. PATENT DOCUMENTS 3,301,825  1/1967  Hostettler et al. .................. 528/354
3,379,693  4/1968  Hostettler et al. .................. 528/354

FOREIGN PATENT DOCUMENTS 2033411  5/1980  United Kingdom .

Primary Examiner—Harold D. Anderson
Attorney, Agent, or Firm—William H. Pittman; James C. Davis, Jr.; James Magee, Jr.

[57] ABSTRACT

Cyclic polycarbonate oligomer compositions are polymerized with lactones in the presence of a catalyst for the polymerization of either. Usually, the lactone is first polymerized at a lower temperature, followed by the cyclic polycarbonate at a higher temperature.

12 Claims, No Drawings

METHOD OF PREPARING COPOLYESTER CARBONATE FROM CYCLIC AROMATIC POLYCARBONATE OLIGOMER AND LACTONE

This invention relates to the preparation of copolyestercarbonates.

U.S. Pat. No. 3,641,200 and French published application No. 2,235,965 describe the preparation of copolyestercarbonates by the incorporation of polylactones or derivatives thereof in a conventional polycarbonate reaction mixture. For the most part, such reaction mixtures are heterogeneous by reason of the presence of an aqueous and an organic phase, with the polycarbonate formation reaction taking place more or less interfacially at the intersection of the two phases.

Such heterogeneous reaction systems are not useful for the preparation of polymers during molding or extrusion operations. This is true because of the necessity to separate the polymer, prior to processing thereof, from the more or less volatile reaction media.

By the present invention, a method is provided for preparing copolyestercarbonates in a system which is homogeneous at polymer formation temperatures. Thus, it is possible to adapt the reaction conditions to accommodate simultaneous forming operations such as extrusion, injection molding and rotational molding.

The present invention is a method for preparing a copolyestercarbonate which comprises reacting at least one lactone with at least one cyclic polycarbonate oligomer in the presence of at least one catalyst for the polymerization of lactones or cyclic polycarbonates, at a temperature within the range of about 180°–300° C.

The lactones useful in the method of this invention may be represented by the formula

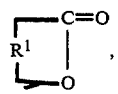   (I)

wherein $R^1$ is a divalent aliphatic hydrocarbon or substituted hydrocarbon radical containing a chain of about 2–20 carbon atoms. The preferred $R^1$ values are straight alkylene chains containing about 4–12 carbon atoms. Illustrative lactones are pivaloloactone, Δ-valerolactone and ε-caprolactone, in which $R^1$ is $CH_2C(CH_3)_2$, $(CH_2)_4$ and $(CH_2)_5$, respectively. Pivalolactone and α-caprolactone are especially preferred.

The cyclic polycarbonate oligomers useful in the method of this invention comprise structural units of the formula

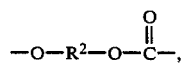   (II)

wherein at least about 60% of the total number of $R^2$ values are divalent aromatic organic radicals, the balance thereof being aliphatic, alicyclic or aromatic organic radicals. Said oligomers include dimers, trimers and tetramers of the type disclosed in the following U.S. patents:

U.S. Pat. No. 3,155,683
U.S. Pat. No. 3,386,954
U.S. Pat. No. 3,274,214
U.S. Pat. No. 3,422,119.

Also included are cyclic polycarbonate oligomer mixtures of the type disclosed in European patent application No. 162,379 and in copending, commonly owned applications Ser. No. 704,122, filed Mar. 20, 1985, and Ser. No. 871,641, filed June 6, 1986, the disclosures of all of which are incorporated by reference herein.

Preferably at least about 80% of the total number of $R^2$ values in the cyclic oligomer mixtures, and most desirably all of said $R^2$ values, are aromatic. The aromatic $R^2$ radicals preferably have the formula

   (III)

wherein each of $A^1$ and $A^2$ is a monocyclic divalent aromatic radical and $Y^1$ is a bridging radical in which one or two atoms separate $A^1$ from $A^2$. The free valence bonds in formula II are usually in the meta or para positions of $A^1$ and $A^2$ in relation to $Y^1$.

In formula III, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^1$, is one in which one or two atoms, preferably one, separate $A^1$ from $A^2$. It is most often a hydrocarbon radical and particularly a saturated radical such as methylene, cyclohexymethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^2$ values may be considered as being derived from dihydroxy compounds of the formula $HO-R^2-OH$, especially dihydroxyaromatic compounds and preferably bisphenols of the formula $HO-A^1-Y^1-A^2-OH$. The following dihydroxy compounds are illustrative:

Ethylene glycol
Propylene glycol
1,3-Propanediol
1,4-Butanediol
1,6-Hexanediol
1,12-Dodecanediol
2-Ethyl-1, 10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynapthalene
2,6-Dihydroxynapthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane 2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)-propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro-(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers are present. The mixtures also usually contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

These mixtures may be prepared by a condensation reaction involving at least one bishaloformate having the formula $$R^2(OCOX)_2 \qquad (IV)$$

wherein $R^2$ is as defined hereinabove and X is chlorine or bromine. The condensation reaction typically takes place interfacially when a solution of said compound in a substantially non-polar organic liquid is contacted with a tertiary amine from a specific class and an aqueous alkali metal hydroxide solution. Also present may be other compounds, including oligomers of the formula

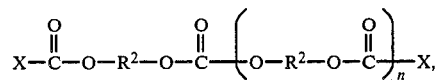

wherein $R^2$ and X are as previously defined and n is a small number, typically about 1–4.

While the X values in formula IV may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid.

In addition to the bisphenol bischloroformate, such crude bischloroformate products may contain oligomer bischloroformates. Most often, a major proportion of the crude product comprises monomer, dimer and trimer bischloroformate. Higher oligomer bischloroformates, and monochloroformates corresponding to any of the aforementioned bischloroformates, may also be present, preferably only in trace amounts.

The tertiary amines useful for cyclic oligomer preparation ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylamino-pyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Suitable aqueous alkali or alkaline earth metal hydroxide or carbonate solutions (hereinafter sometimes designated "metal base") include lithium, sodium, potassium or calcium hydroxide or sodium or potassium carbonate. Sodium hydroxide is preferred because of its availability and relatively low cost. The concentration of the solution is not critical and may be about 0.2–16M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer, the reagents and components are maintained in contact under conditions whereby the bischloroformate is present in low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate, and optionally other reagents, are added gradually to a reaction vessel containing solvent.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 1.5 mole of bischloroformate per liter of organic liquid in the reaction system, including any liquid used to dissolve bischloroformate. Preferably, about 0.003–1.0 mole of bischloroformate is used.

The molar proportions of the reagents constitute another important feature for yield and purity maximization. The preferred molar ratio of amine to bischloroformate used alone (calculated as bisphenol bischloroformate) is about 0.1–1.0:1 and most often about 0.15–0.6:1, and that of metal base to bischloroformate is about 1.5–3:1 and most often about 2–3:1.

Separation of the oligomer mixture from at least a portion of the high polymer and insoluble material present is sometimes necessary or desirable. When other reagents are added to the metal base and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions described hereinafter are employed, the product may contain 10% or even less of such material. Depending on the intended use of the cyclic oligomer mixture, the separation step may then be unnecessary.

When such removal is necessary, it may be achieved by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The cyclic bisphenol A polycarbonate oligomer mixtures have been shown to contain oligomers having degrees of polymerization from 2 to 12, including substantially all of those from 2 to 6, with about 50–70% (by weight) thereof being in the range from 2 to 5. It is generally preferred to use said mixtures as prepared, or optionally with separation of high polymer and/or insolubles.

The preparation of cyclic oligomer mixtures is illustrated by the following examples. All parts and percentages in the examples herein are by weight unless otherwise indicated. Temperatures are in degrees Celsius. Molecular weights are weight average unless otherwise indicated and were determined by gel permeation chromatography relative to polystyrene.

EXAMPLES 1–18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1–10 and 12, the triethylamine was all originally present in the reaction vessel; in Examples 14–16, it was added gradually at the same time as the bischloroformates; and in Examples 11, 13, 17 and 18, it was added in equal increments at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymer was precipitated by addition of acetone.

The reaction conditions for Examples 1–18 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE 1

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
| --- | --- | --- | --- | --- | --- | --- | --- |
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40–45 | 105 | 79 |
| 18 | 500 | 10 | 2.5 | 0.4 | 25 | 105 | 79 |

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 20

A crude bisphenol A bischloroformate product was analyzed as follows:
Monomer bischloroformate 58%
Dimer bischloroformate 26%
Trimer bischloroformate 10%
and had an average degree of polymerization of about 1.5. An amount thereof containing 800 mmol. of monomer and oligomer bischloroformates, calculated as monomer bischloroformate, dissolved in one-half the total amount of methylene chloride used, and 450 ml. of 5M aqueous sodium hydroxide were added over 37 minutes, with stirring, to a reaction vessel containing the balance of the methylene chloride. The total amount of bischloroformate was 400 mmol. per liter of methylene chloride. Triethylamine, 200 mmol., was added in equal increments at intervals of 25% during bischloroformate addition. The peak reaction temperature was 37°. Upon workup as in Examples 1–18, there was obtained a product comprising 82% cyclic polycarbonate oligomer.

EXAMPLE 21

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux with stirring, as 40 ml. of a 1.06M solution of the bischloroformate in methylene chloride was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

The catalysts which can be used in the method of this invention include various bases and Lewis acids useful for polymerizing cyclic polycarbonates and/or lactones. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used in the present invention. Examples thereof are lithium 2,2,2-trifluoroethoxide, n-butyllithium and tetramethylammonium hydroxide. Also useful are various weakly basic salts such as sodium benzoate and lithium stearate.

Lewis bases which catalyze the conversion of lactones to polyesters are also useful. They include aluminum alkoxides, particularly those containing $C_{2-8}$ alkyl groups; an example is aluminum isopropoxide. It is generally preferred to purify such aluminum alkoxides, as by distillation, just before use in order to promote the formation of polymers of high molecular weight.

A particularly useful class of Lewis bases is disclosed in copending, commonly owned application Ser. No. 723,672, filed Apr. 16, 1985. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

The Lewis acids useful as polycarbonate formation catalysts are selected from non-halide compounds and include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the trade name "Tyzor AA") and the bisisopropoxyaluminum salt of ethyl acetoacetate. Among the preferred catalysts are lithium stearate and bisisopropoxytitanium biscetylacetonate.

The reaction of this invention may be conducted in various ways. For example, the catalyst may be contacted first with the lactone at a temperature adequate for polymerization thereof, typically about 125°–175° C. The result is the formation of a "living" anionic polylactone species. This species may in turn be reacted with the cyclic polycarbonate oligomer composition at a temperature within the range of about 180°–300° C., whereupon polymerization of said oligomer composition is initiated. Another method is to blend the catalyst with both the lactone and the cyclic polycarbonate oligomer composition, with heating to a temperature at which both will polymerize simultaneously, or, in a two-stage process, to a lower temperature at which one (ordinarily the lactone) will polymerize and subsequently to a higher temperature at which the other will polymerize.

Thus, it will be apparent that the present invention contemplates initiation of cyclic polycarbonate oligomer mixtures by the "living" anionic polylactone species, as well as initiation of lactone polymerization by the "living" anionic polycarbonate species. In this regard, however, it should be noted that the previously mentioned tetraarylborate salts are effective as catalysts only to initiate cyclic polycarbonate polymerization. When they are used, therefore, lactone polymerization must be the second stage in the reaction.

Infrared spectra of the products prepared by the method of this invention indicate that they are not predominantly block copolymers, as might be expected. Instead, a substantial amount of equilibration occurs with the formation, for example, or alkyl carbonate moieties derived from the lactone as well as carbonate moieties derived from the cyclic polycarbonate oligomers.

The method of this invention is illustrated by the following examples.

EXAMPLE 22

A mixture of 500 mg. (1.969 mmol.) of a cyclic bisphenol A polycarbonate oligomer mixture similar to that of Example 21, 220 mg. (1.93 mmol.) of freshly distilled ε-caprolactone and 0.4 mg. (0.0019 mmol.) of freshly distilled aluminum isopropoxide was heated for ½ hour at 250° C. The mixture was cooled and dissolved in methylene chloride, and the polymer was precipitated by pouring into methanol, dissolved in toluene, filtered and again precipitated. The product had a weight average molecular weight (as determined by gel permeation chromatography relative to polystyrene) of 40,620. It was shown by proton nuclear magnetic resonance to contain about 40% polycarbonate and 60% polylactone units, and had a glass transition temperature of 46° C.

EXAMPLE 23

A mixture of 1 gram (3.9 mmol.) of a bisphenol A cyclic polycarbonate oligomer mixture similar to that of Example 21, 2 grams (20 mmol.) of pivalolactone and 0.8 mg. (0.0038 mmol.) of freshly distilled aluminum isopropoxide was heated overnight at 140° C., whereupon polymerization of the pivalolactone was initiated. The mixture was then warmed slowly to 200° C. and maintained at that temperature for 1 hour, followed by 2 hours at 250° C. The polymeric product was insoluble in most organic solvents and had a glass transition temperature of 120° C. and a crystalline melting point of 231.5° C.

EXAMPLE 24

The procedure of Example 23 was repeated, using 1 gram (10 mmol.) of pivalolactone, 2.54 grams (10 mmol.) of cyclic polycarbonate oligomer mixture and 2 mg. (0.01 mmol.) of aluminum isopropoxide. The product was dissolved in chloroform (in which it was soluble) and reprecipitated by pouring into methanol; it was again dissolved in chloroform, reprecipitated by pouring into acetone, filtered and dried. The product had a weight average molecular weight of 123,400, a glass transition temperature of 117.9° C. and a crystalline melting point of 221.9° C.

The compositions prepared by the method of this invention are useful for the formation of polymeric films and moldable thermoplastics with a high degree of toughness. They are also useful for the compatibilization of blends of polycarbonates with partly or wholly aliphatic polyesters.

What is claimed is:

1. A method for preparing a copolyestercarbonate which comprises blending at least one catalyst for the polymerization of lactones or cyclic polycarbonates with at least one lactone and at least one cyclic polycarbonate oligomer composition, and heating the blend to a temperature within the range of about 180°–300° C. at which polymerization of said lactone and said oligomer composition will occur simultaneously.

2. A method as in claim 1 wherein the lactone has the formula

wherein $R^1$ is a divalent aliphatic hydrocarbon or substituted hydrocarbon radical containing a chain of about 2–20 carbon atoms.

3. A method as in claim 2 wherein the cyclic polycarbonate oligomer composition comprises structural units of the formula

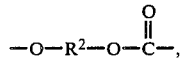  (II)

wherein at least about 60% of the total number of $R^2$ values are divalent aromatic organic radicals, the balance thereof being aliphatic, alicyclic or aromatic organic radicals.

4. A method according to claim 3 wherein a mixture of cyclic polycarbonate oligomers is reacted.

5. A method according to claim 4 wherein $R^1$ is an alkylene radical.

6. A method according to claim 5 wherein the $R^2$ radicals have the formula $$-A^1-Y^1-A^2-$$  (III)

wherein each of $A^1$ and $A^2$ is a monocyclic divalent aromatic radical and $Y^1$ is a bridging radical in which one or two atoms separate $A^1$ from $A^2$.

7. A method according to claim 6 wherein $R^1$ contains a chain of about 4–12 carbon atoms.

8. A method according to claim 7 wherein the catalyst is a base or a non-halide-containing Lewis acid.

9. A method according to claim 8 wherein the catalyst is a freshly purified aluminum $C_{2-8}$ alkoxide.

10. A method according to claim 9 wherein each of $A^1$ and $A^2$ is a p-phenylene and $Y^1$ is isopropylidene.

11. A method according to claim 10 wherein the lactone is ε-caprolactone.

12. A method according to claim 10 wherein the lactone is pivalolactone.

* * * * *